(12) United States Patent
Yoon et al.

(10) Patent No.: US 10,133,104 B2
(45) Date of Patent: Nov. 20, 2018

(54) DISPLAY DEVICE AND METHOD FOR MANUFACTURING SAME

(71) Applicant: SAMSUNG ELECTRONICS CO., LTD., Suwon-si, Gyeonggi-do (KR)

(72) Inventors: Eung Yeoul Yoon, Suwon-si (KR); Joo Ho Kim, Suwon-si (KR); Jin Seung Choi, Suwon-si (KR); Sang Cheol Moon, Seoul (KR); Hee Yuel Roh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/122,363

(22) PCT Filed: Mar. 2, 2015

(86) PCT No.: PCT/KR2015/001999
§ 371 (c)(1),
(2) Date: Aug. 29, 2016

(87) PCT Pub. No.: WO2015/133779
PCT Pub. Date: Sep. 11, 2015

(65) Prior Publication Data
US 2016/0370642 A1    Dec. 22, 2016

(30) Foreign Application Priority Data
Mar. 4, 2014 (KR) .................. 10-2014-0025550

(51) Int. Cl.
*G02F 1/1333* (2006.01)
*G02F 1/1341* (2006.01)
(Continued)

(52) U.S. Cl.
CPC ..... *G02F 1/133377* (2013.01); *G02B 26/005* (2013.01); *G02F 1/0316* (2013.01);
(Continued)

(58) Field of Classification Search
CPC .................................................. G02F 1/133377
See application file for complete search history.

(56) References Cited

U.S. PATENT DOCUMENTS

| | | | | |
|---|---|---|---|---|
| 5,828,432 A * | 10/1998 | Shashidhar | ......... | G02F 1/13439 349/139 |
| 5,828,434 A * | 10/1998 | Koden | .............. | G02F 1/133512 349/110 |
| 2015/0276430 A1 * | 10/2015 | Sekitani | ............... | A61B 5/0478 324/609 |

FOREIGN PATENT DOCUMENTS

| CN | 101681578 | 3/2010 |
|---|---|---|
| CN | 102338962 | 2/2012 |

(Continued)

OTHER PUBLICATIONS

International Search Report dated Jun. 10, 2015, in corresponding International Application No. PCT/KR2015/001999.

(Continued)

*Primary Examiner* — James Dudek
(74) *Attorney, Agent, or Firm* — Staas & Halsey LLP

(57) ABSTRACT

Disclosed herein are a display device which exhibits superior surface flatness of an upper electrode substrate and excellent sealing effects by performing sealing such that an end of a barrier formed in a front electrode is inserted into the upper electrode having a gel-state, and a method of producing the same. The display device includes a first electrode module comprising a first electrode, a second electrode module including a second electrode, the second electrode module facing the first electrode module, a plurality of barriers formed on the first electrode module, each barrier having an end inserted into the second electrode, a plurality of cavities formed by the first electrode module and the barriers, and an electric field-dependent layer formed in each of the cavities, the electric field-dependent layer having (Continued)

properties changed by an electric field applied between the first electrode module and the second electrode module.

18 Claims, 22 Drawing Sheets

(51) Int. Cl.
  *G02F 1/167*    (2006.01)
  *G02B 26/00*    (2006.01)
  *G02F 1/03*     (2006.01)
  *G02F 1/1343*    (2006.01)
  *G02F 1/155*    (2006.01)
  *G02F 1/153*    (2006.01)

(52) U.S. Cl.
  CPC ........ *G02F 1/1341* (2013.01); *G02F 1/13439* (2013.01); *G02F 1/155* (2013.01); *G02F 1/1533* (2013.01); *G02F 1/167* (2013.01); *G02F 2001/1672* (2013.01); *G02F 2001/1676* (2013.01); *G02F 2202/32* (2013.01); *G02F 2202/36* (2013.01); *G02F 2202/38* (2013.01)

(56) References Cited

FOREIGN PATENT DOCUMENTS

| KR | 10-2006-0131551 | 12/2006 |
| KR | 10-2011-0025410 | 3/2011 |
| KR | 10-2012-0002380 | 1/2012 |
| KR | 10-2012-0023389 | 3/2012 |
| KR | 10-2012-0122434 | 10/2012 |

OTHER PUBLICATIONS

Written Opinion of ISA (PCT/ISA/237), dated Jun. 10, 2015, in corresponding International Application No. PCT/KR2015/001999.
Extended European Search Report dated Nov. 7, 2017 in European Patent Application No. 15758781.7.
Chinese Office Action dated Aug. 29, 2018 in Chinese Patent Application No. 201580022673.X.

\* cited by examiner

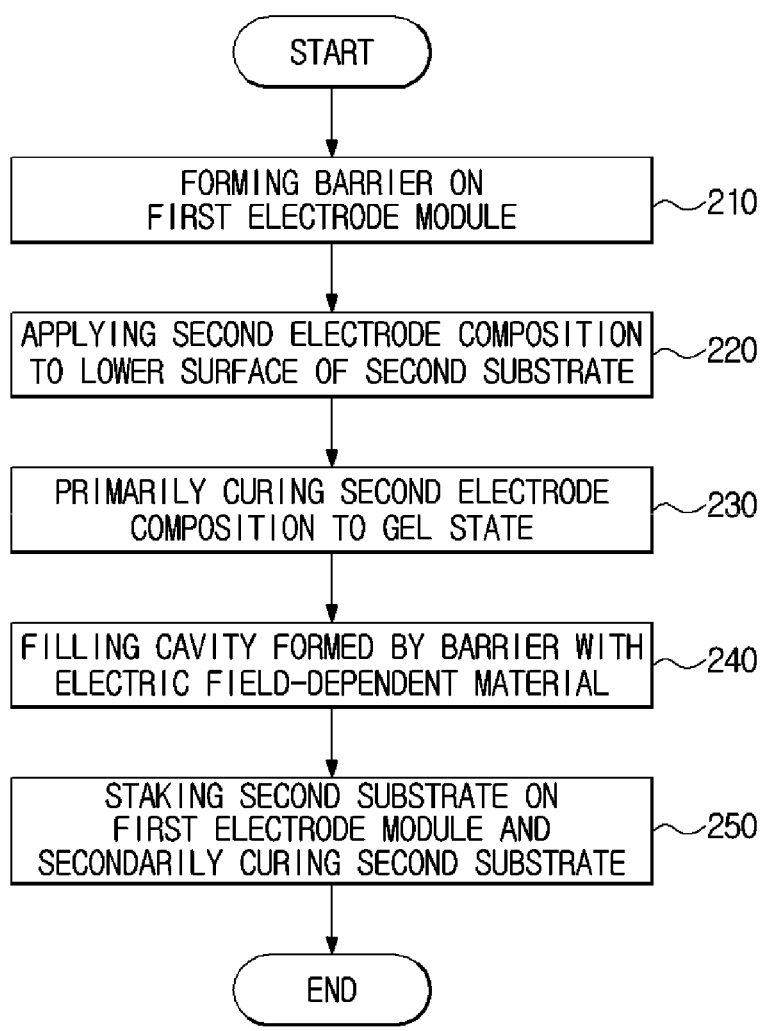

100

DISPLAY DEVICE AND METHOD FOR MANUFACTURING SAME

This application is a U.S. national stage application of PCT international application PCT/KR2015/001999 filed on Mar. 2, 2015, and claims the benefit of Korean Patent Application No. 10-2014-0025550, filed on Mar. 4, 2014, in the Korean Intellectual Property Office. The content of each of the foregoing is incorporated herein by reference.

TECHNICAL FIELD

Embodiments of the present invention relate to a display device which displays an image by filling a material, properties of which are changed according to an electric field applied between two electrodes and controlling a level of the electric field, and a method of producing the same.

BACKGROUND ART

A display device is an apparatus which visually displays information such as text, images or color. Flat display devices that have little limitation on installation space because they reduce high weight and volume which are disadvantages of cathode ray tubes, are easy to display large screen images and to provide flatness and exhibit superior functions such as high image quality are developed, which enable miniaturization and portability of display devices and combination of the display devices with other devices.

Most of flat display devices implement color by filling a material, properties of which change upon application of an electric field between an upper electrode and a lower electrode and applying a voltage to the upper electrode and the lower electrode.

DISCLOSURE

Technical Problem

Therefore, it is an aspect of the present invention to provide a display device which exhibits superior surface flatness of an upper electrode substrate and excellent scaling effects by performing sealing such that an end of a barrier formed in a front electrode is inserted into the upper electrode having a gel-state, and a method of producing the same.

Additional aspects of the invention will be set forth in part in the description which follows and, in part, will be obvious from the description, or may be learned by practice of the invention.

Technical Solution

In accordance with one aspect of the present invention, a display device includes a first electrode module comprising a first electrode, a second electrode module comprising a second electrode, the second electrode module facing the first electrode module, a plurality of barriers formed on the first electrode module, each barrier having an end inserted into the second electrode, a plurality of cavities formed by the first electrode module and the barriers, and an electric field-dependent layer formed in each of the cavities, the electric field-dependent layer having properties changed by an electric field applied between the first electrode module and the second electrode module.

The second electrode may include a second electrode composition, and the second electrode composition may include a conductive material present in a gel state.

The second electrode composition may include at least one selected from the group consisting of a conductive polymer, carbon nanotutes (CNT), a metal nano-powder and graphene.

The conductive polymer may include at least one selected from the group consisting of polythiophene (PT), polyacetylene (PA), polyaniline (PA), polypyrrole (PPy) and polyphenylene (PP).

The conductive polymer may include poly(3,4-ethylenedioxythiophene) (PEDOT).

The second electrode composition may further include a UV curing agent or a heat curing agent.

The electric field-dependent layer may include at least one selected from the group consisting of a photonic crystal layer, an electrophoretic layer, an electrowetting layer, a cholesteric liquid crystal layer and a photoelectrochromic layer.

The first electrode module may further include a first substrate on which the first electrode is formed.

The second electrode module may further include a transparent second substrate on which the second electrode is formed, and the second electrode may be transparent.

The first electrode and the first substrate may be transparent.

In accordance with another aspect of the present invention, a method of producing a display device includes forming a plurality of barriers on a first electrode module including a first substrate and a first electrode, applying a second electrode composition to a lower surface of a second substrate, primarily curing the applied second electrode composition to a gel state, stacking the second substrate on the barriers formed on the first electrode module, and secondarily curing the second electrode composition.

The stacking may include inserting an end of each of the barriers into the gel-state second electrode composition.

The secondary curing may include emitting UV light or heat to the second electrode composition-applied second substrate.

The second electrode composition may include a conductive material present in a gel state and a UV curing agent or a heat curing agent.

The conductive material may include at least one selected from the group consisting of a conductive polymer, carbon nanotutes (CNT), a metal nano-powder and graphene.

The conductive polymer may include at least one selected from the group consisting of polythiophene (PT), polyacetylene (PA), polyaniline (PA), polypyrrole (PPy), and polyphenylene (PP).

The stacking may include using a roll pressing process.

The stacking may be performed simultaneously with the secondary curing.

The method may further include forming an electric field-dependent layer having properties changed by an electric field, in the cavities formed by the barriers.

The forming the electric field-dependent layer may be performed before the stacking the second substrate.

The forming the electric field-dependent layer may include filling the cavities with a photonic crystal material.

The forming the electric field-dependent layer may include filling the cavities with an electrophoretic fluid including charged particles.

The forming the electric field-dependent layer may include filling the cavities with a plurality of fluids immiscible with each other.

The forming the electric field-dependent layer may include filling the cavities with a cholesteric liquid crystal.

Advantageous Effects a display device and a method of producing the same according to the embodiments of the present invention provide superior surface flatness of an upper electrode substrate and excellent sealing effects by performing sealing such that an end of a barrier formed in a front electrode is inserted into the upper electrode having a gel-state.

DESCRIPTION OF DRAWINGS

These and/or other aspects of the invention will become apparent and more readily appreciated from the following description of the embodiments, taken in conjunction with the accompanying drawings of which:

FIG. 2 is a flowchart illustrating a method of producing a display device according to an embodiment;

BEST MODEL

Figure 1:
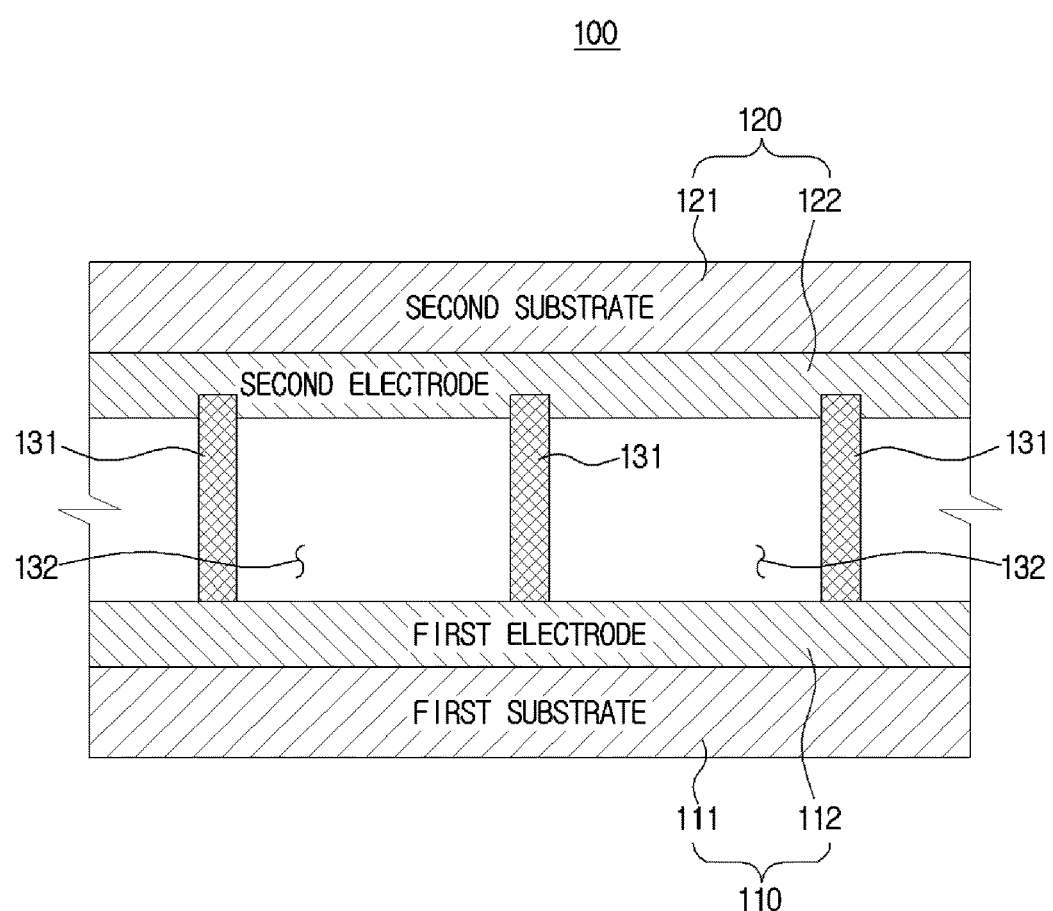
FIG. 1 is a sectional view illustrating a display device according to the embodiment.

Reference will now be made in detail to the embodiments of the present invention, examples of which are illustrated in the accompanying drawings, wherein like reference numerals refer to like elements throughout.

A display device and a method of producing the same according to an embodiment of the present invention will be described in detail with reference to the annexed drawings.

FIG. 1 is a sectional view illustrating a display device according to the embodiment. The sectional view of FIG. 1 shows a part of the display device 100.

Referring to FIG. 1, the display device 100 according to the embodiment includes a first electrode module 110, a second electrode module 120 and a barrier 131 formed between the first electrode module 110 and the second electrode module 120.

The first electrode module 110 includes a first substrate 111 corresponding to a rear electrode substrate or a lower electrode substrate and a first electrode 112 corresponding to a rear electrode or a lower electrode, and the first electrode 112 is formed on the first substrate 111.

The second electrode module 120 includes a second substrate 121 corresponding to a front electrode substrate or an upper electrode substrate and a second electrode 122 corresponding to a front electrode or an upper electrode and the second electrode 122 is formed on the second substrate 121. The front surface means a surface seen by a viewer who views the display device 100.

The second substrate 121 and the second electrode 122 are made of a transparent material and the first substrate 111 and the first electrode 112 are also made of a transparent material according to display method of the display device 100.

In addition, both the first substrate 111 and the second substrate 121 may be flexible plastics and either the first substrate 111 or the second substrate 121 may be flexible. When the substrate is formed of a flexible plastic, the display device 100 may become thinner or lighter weight and be freely bent or crooked, and be thus variously designed.

The barrier 131 is formed between the first electrode module 110 and the second electrode module 120 and defines an area between the first electrode module 110 and the second electrode module 120. The barrier 131 may be provided in plural so that the barrier 131 divides the area between the first electrode module 110 and the second electrode module 120 into a plurality of sub-areas. The area defined by the barrier 131 may be referred to as various terms such as micro cup, u-cup, cavity or cell, and the area defined by the barrier 131 is referred to as a "cavity" in the following embodiment.

An electric field is formed in the cavity 132 when a voltage is applied to the first electrode 112 and the second electrode 122. An electric field-dependent layer, properties of which are changed by the electric field, is formed in the cavity 132 and the display device 100 displays information such as text, image or color using change of properties of the electric field-dependent layer. The electric field-dependent layer is formed by filling the cavity 132 with an electric field-dependent material, properties of which are changed by the electric field. The material filling the cavity 132 is also changed according to a method of displaying information by the display device 100. Accordingly, the material filling the cavity 132 is not shown in FIG. 1 and this will be described in detail later.

As shown in FIG. 1, the barrier 131 has an end which is inserted into the second electrode 122. For this purpose, the second electrode 122 includes a conductive material that may be present in a gel state and the end of the barrier 131 is inserted into the second electrode 122 when the second electrode 122 is present in the gel state in the process of producing the display device 100, as described later.

When the barrier 131 is inserted into the second electrode 122, the surface of the second electrode module 120, more specifically, the surface of the second substrate 121 may be flat, regardless of heights of the barriers 131. As a result, mura of light is inhibited and contrast ratio is improved.

Hereinafter, the structure and operation of the display device 100 according to the embodiment shown in FIG. 1 will be described in conjunction with a method of producing the display device according to the embodiment.

FIG. 2 is a flowchart illustrating a method of producing a display device according to an embodiment. The production method of the display device according to the present embodiment is used for production of the display device 100.

Referring to FIG. 2, a barrier 131 is formed on the first electrode module 110 (210).

Examples of a method of forming the barrier 131 on the first electrode module 110 include stamp forming, photolithography using a roll to roll process and the like. The roll to roll process continuously and simultaneously performs a series of operations including formation of substrate, injection of material and sealing. The roll to roll process enables mass-production of the display device 100 and reduces production costs. The roll to roll process is applicable when the first substrate 111 and the second substrate 121 are formed to be flexible. The description of the formation of the barrier 131 will be given later.

A second electrode composition is applied to a lower surface of the second substrate 121 (220).

The second electrode composition means a composition which is converted into the second electrode 122 when cured and includes a material that may be present in a gel state. For example, the second electrode composition includes at least one of conductive materials such as a conductive polymer including polythiophene (PT), polyacetylene (PA), polyaniline (PA) and polypyrrole (PPy) and polyphenylene (PP), a metal nano-powder including a silver nano-powder and a gold nano-powder, carbon nanotutes (CNT) and graphene. In particular, when the second electrode composition includes polythiophene, the polythiophene may be poly(3,4-ethylenedioxythiophene)(PEDOT).

In addition, the second electrode composition may further include a curing agent and a binder, in addition to the conductive material and the curing agent may further include at least one of a heat curing agent and a UV curing agent.

Specifically, when the conductive material contained in the second electrode composition is a conductive polymer including polythiophene (PT), polyacetylene (PA), polyaniline (PA), polypyrrole (PPy) and polyphenylene (PP), crosslinking density of the conductive polymer is increased by adding polycellulosesulfonate or poly(4-styrenesulfonate) as a dopant and a conductive composition having superior electrical conductivity and stability is thus obtained. The dopant may be added in combination of two or more types of dopants.

An example of a composition ratio of the second electrode composition will be described in detail.

The second electrode composition may include 0.1 to 50% by weight of a conductive polymer doped with 0.01 to 20% by weight of a first dopant, and 50 to 99.9% by weight of a solvent.

The solvent may include at least one selected from the group consisting of aliphatic compounds including alcohols, ketones sulfoxides, carboxylic acid amides, carboxylic acid esters, hydrocarbons and the like, sorbitol and acetonitrile.

The first dopant may be polycellulosesulfonate or poly (4-styrenesulfonate).

0.01 to 5% by weight of a second dopant may be further doped and the second dopant may include at least one selected from the group consisting of dimethyl sulfoxide, N-dimethyl acetamide, N-methyl pyrrolidone, N,N-dimethyl formamide and sorbitol.

In addition, the second electrode composition may further include 0.01 to 10% by weight of at least one binder selected from the group consisting of cellulose-, carboxyl-, urethane-, epoxy-, ester-, ether- and amide-based binders.

In addition, the second electrode composition may further include 0.01 to 5% by weight of at least one selected from the group consisting of a metal powder, a wire, carbon nanotubes and graphene.

The applied second electrode composition is primarily cured to a gel state (230).

As described above, the second electrode composition is a substance that may be present in a gel state. Accordingly, the second electrode composition may be cured to a gel state after application to the lower surface of the second substrate 121. This process corresponds to primary curing.

For convenience of description, it is described that formation of the barrier 131 is performed before the application of the second electrode composition and the primary curing. However, the formation of the barrier 131 may be performed after or during the application of the second electrode composition and the primary curing according to the production process of the display device 100.

The cavity 132 formed by the barrier 131 is filled with an electric field-dependent material (240).

As described with reference to FIG. 1 above, a plurality of cavities 132 are formed by a plurality of barriers 131. An electric field-dependent layer is formed by filling the cavities 132 with an electric field-dependent material. This will be described in detail later.

The second electrode composition-applied second substrate 121 is stacked on a first electrode module 110 and is then secondarily cured (250).

An end of the barrier 131 is inserted into the second electrode composition by stacking the second substrate 121 on the first electrode module 110, because the second electrode composition applied to the lower surface of the second substrate 121 is present in a gel state.

The secondary curing may be performed by applying UV or heat according to type of the curing agent contained in the second electrode composition. When the second electrode composition includes a UV curing agent, an energy of the emitted UV light may be changed according to desired curing degree, composition ratio of the second electrode composition, application thickness or the like. For example, UV light having an energy of 500 to 100 mJ may be emitted.

The method of producing the display device according to the embodiment has been described sequentially with reference to FIG. 2, but the order of the remaining operations may be changed or the remaining operations may be simultaneously performed, with the proviso that the filling of the cavities 132 with the electric field-dependent material (240) is performed after formation of the barrier on the first electrode module 110 (210).

Hereinafter, respective operations of a method of controlling the display device and a configuration of the display device 100 will be described in detail.

Figure 3A:
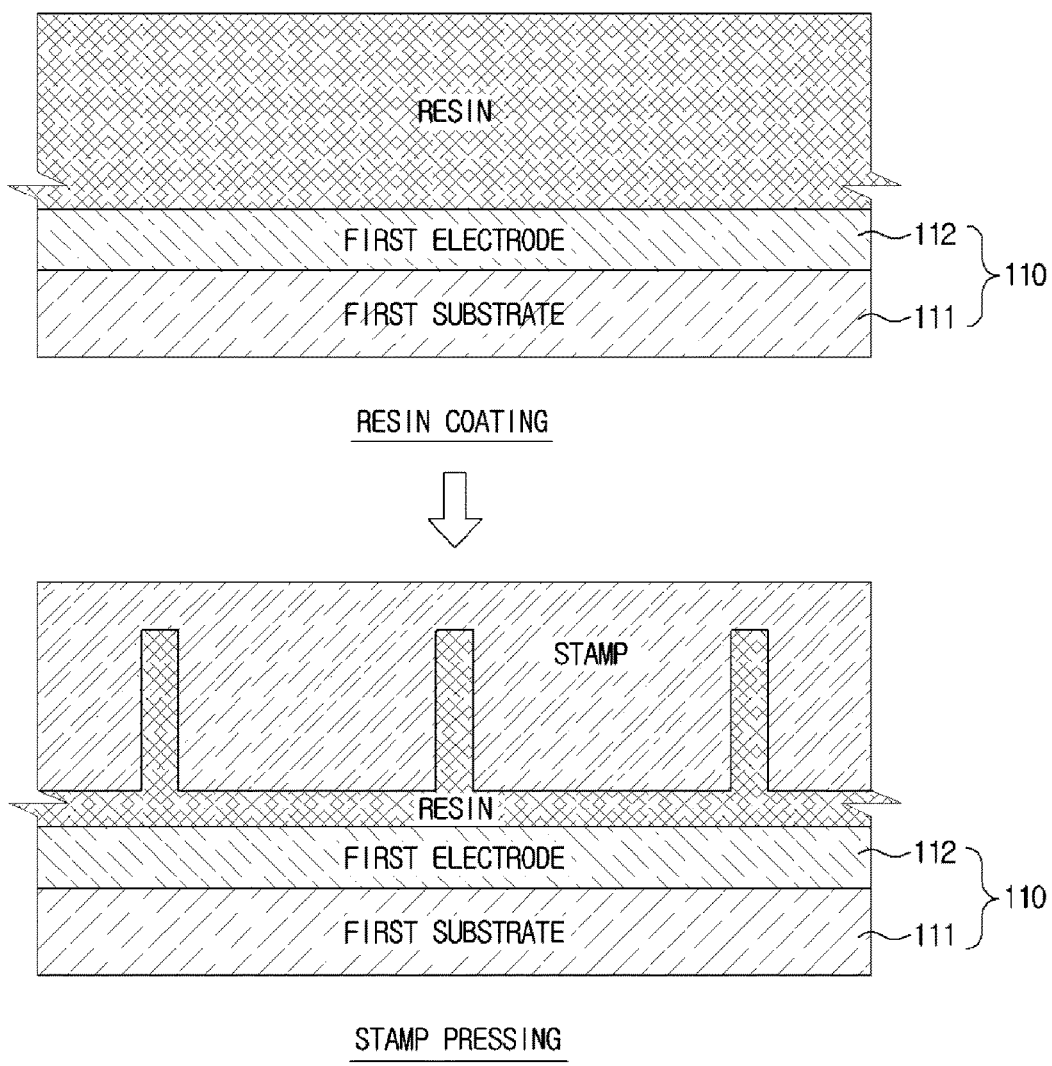
FIGS. 3A and 3B are schematic views illustrating a process of forming a barrier on a first electrode module.
Figure 3B:
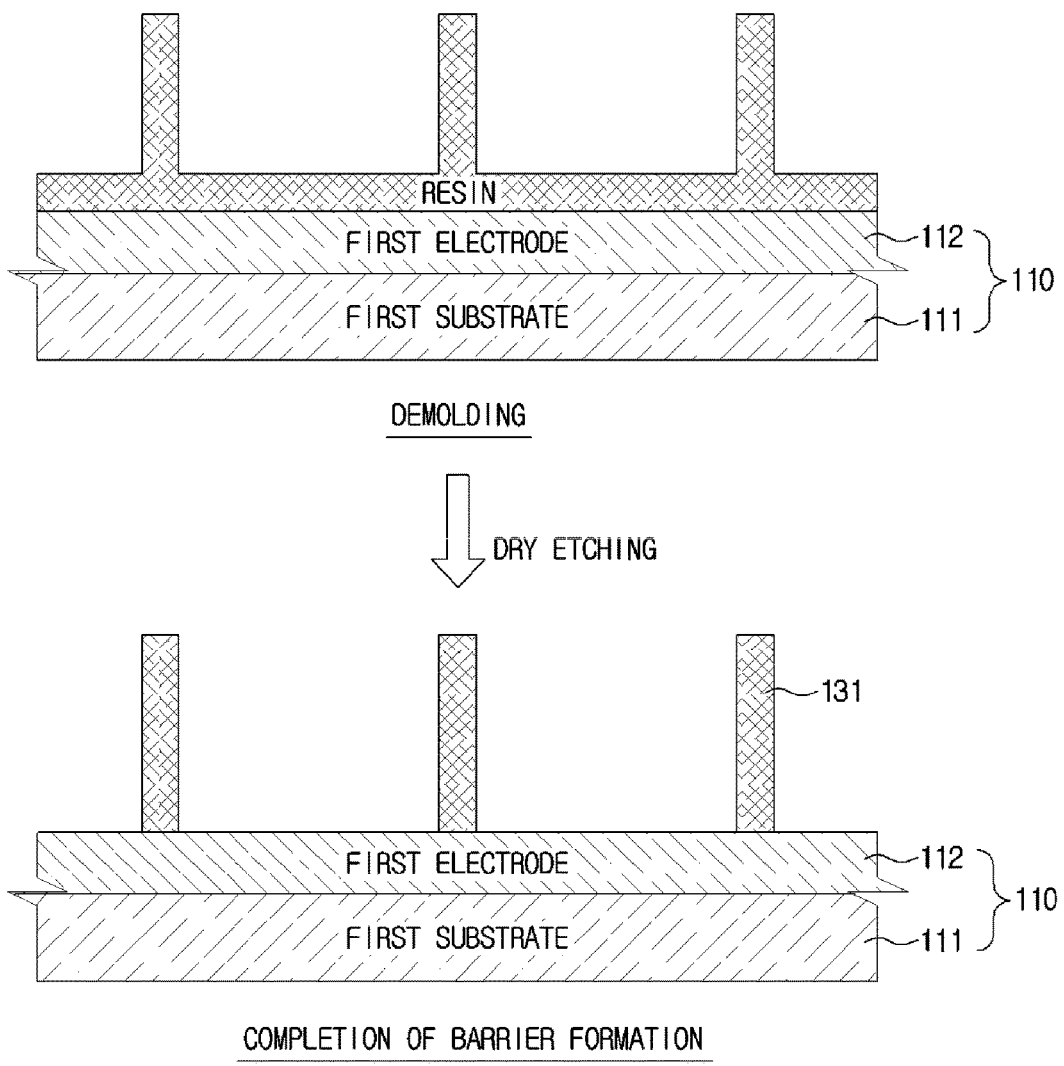

FIGS. 3A and 3B are schematic views illustrating a process of forming a barrier on the first electrode module.

Referring to FIG. 3A, the first electrode module 110 is coated with a resin and a stamp is pressed on the coated resin.

The first electrode module 110 includes a first electrode 112 formed on a first substrate 111. The first substrate 111 may be made of a glass or resin and the resin may, for example, be selected from silicon, silicon oxide, silicon carbide, polyethylene terephthalate (PET), polyethylene naphthalate (PEN) and the like. The substances are provided only as examples of materials used for the production of the first substrate 111 and various other substances, in addition to the substances, may be used for production of the first substrate 111.

The first electrode 112 may be formed of a conductive material such as metal oxides including indium tin oxide (ITO), fluorinated tin oxide (FTO), indium oxide (IO) and tin oxide ($SnO_2$), a conductive resin including polythiophene (PT), polyacetylcne (PA), polyaniline (PA), polypyrrole (PPy) and polyphenylene vinylene (PPV), a metal nano-powder including a silver nano-powder and a gold nano-powder, carbon nanotutes (CNTs) and graphene, or a combination thereof. The substances are provided as examples of materials used for production of the first electrode 112 and in addition to the materials, various other materials may be used for production of the first electrode 112.

There is no particular limitation as to type of the resin coated on the first electrode module 110 so long as the resin is a non-conductive resin such as polycarbonate (PC), polymethyl methacrylate (PMMA) or polyethylene terephthalate (PET).

In addition, the resin pressed by the stamp 10 is cured. The curing of the resin may be carried out by a variety of methods such as UV curing or thermal curing.

After curing of the resin, the stamp 10 is removed, as shown in FIG. 3B. This is referred to as "demolding". Residues are removed by dry etching. The dry etching may be carried out by generating plasma using a gas such as $O_2$, $SF_6$ or $CH_4$.

The process of forming the barrier described with reference to FIGS. 3A and 3B is provided as an example of the process applicable to the production method of the display device according to the embodiment and the barrier 131 may be formed on the first electrode module 110 by various other methods.

In another example, the barrier 131 may be imprinted by a roll-to-roll process using an embossing roller. The embossing roller performs the same function as the stamp 10 described with reference to FIGS. 3A and 3B.

Figure 4:
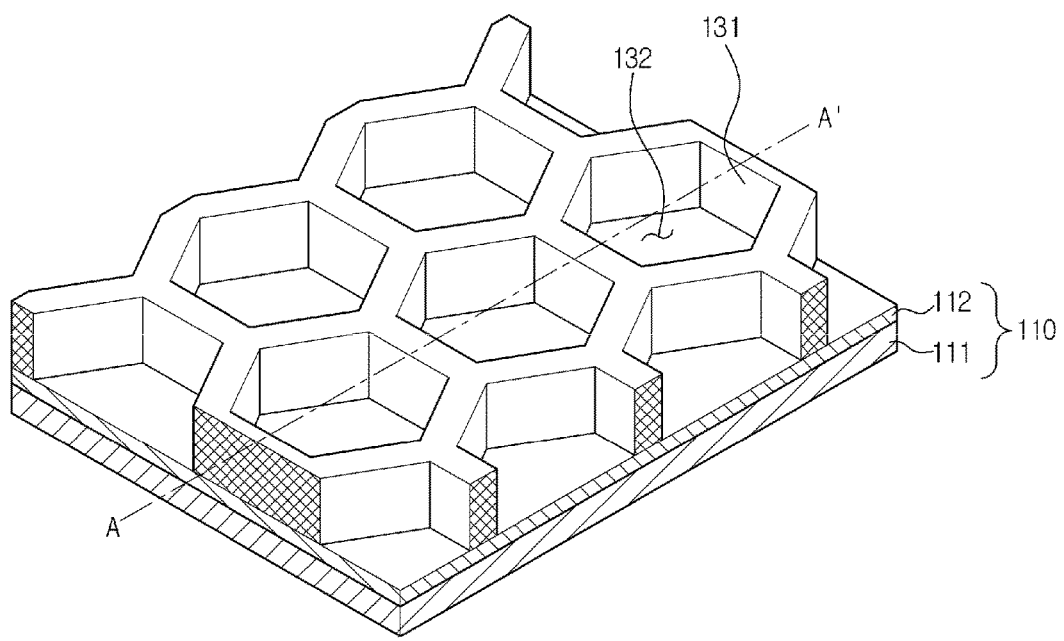
FIGS. 4 and 5 are perspective views illustrating an example of the barrier formed on the first electrode module.
Figure 5:
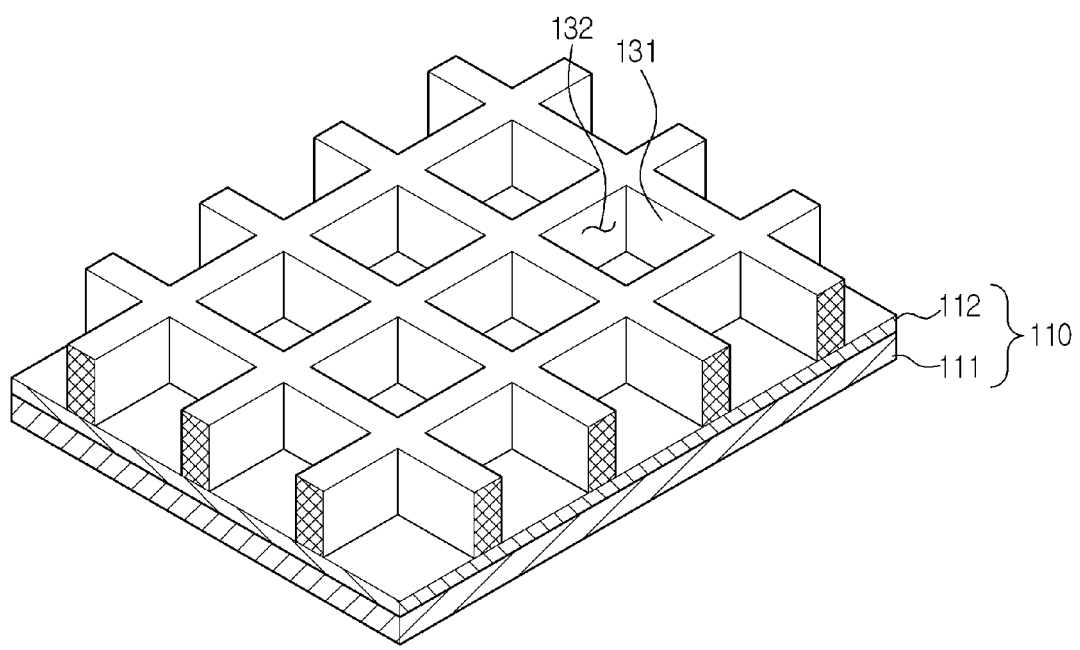

FIGS. 4 and 5 are perspective views illustrating an example of the barrier formed on the first electrode module.

The cavities 132 formed by the barriers 131 may have a hexagonal shape as shown in FIG. 4, or a rectangular shape as shown in FIG. 5. The cross-section taken along the line A-A' of FIG. 4 corresponds to the sectional view of FIG. 1.

However, the embodiment of the display device 100 or the production method thereof may be limited to that shown in FIGS. 4 and 5, and the cavity 132 may have a polygonal shape other than the rectangular or hexagonal shape, a circular shape, or an amorphous shape other than polygonal shape or the circular shape. In addition, the shape of the cavity may be a combination of different shapes.

Figure 6:
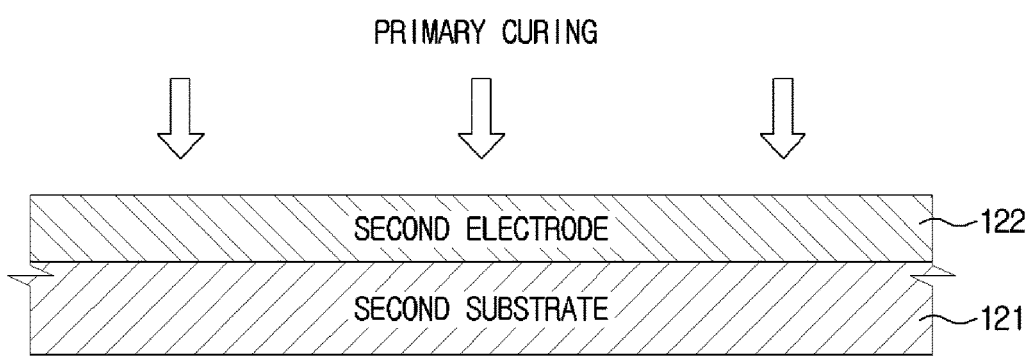
FIG. 6 is a schematic view illustrating primary curing of a second electrode composition applied to the second substrate.

FIG. 6 is a schematic view illustrating primary curing of a second electrode composition applied to the second substrate.

The second substrate 121 is formed to be transparent. Accordingly, the second substrate 121 may be made of a glass or transparent resin. For example, the resin may be selected from the group consisting of silicon, silicon oxide, silicon carbide, polyethylene terephthalate (PET) and polyethylene naphthalate (PEN). The substances are provided only as examples of materials used for the production of the second substrate 121 and various substances other than these substances may be used for production of the second substrate 121.

As shown in the flowchart of FIG. 2, a second electrode composition is applied to a lower surface of the second substrate 121 (220) and is then primarily cured (230). The primary curing converts the second electrode composition 122a from a liquid state to a gel state. The gel state is a state of the second electrode composition 122a applied to the lower surface of the second substrate 121 such that the second electrode composition 122a has a predetermined viscosity so as to not flow down and is not cured hard so as to be inserted upon application of pressure to the barrier 131.

The primary curing may be heat or UV curing. A suitable curing agent may be added to the second electrode composition according to curing method. When the primary curing is heat curing, temperature and time used for the curing may be changed according to composition ratio or application thickness of the second electrode composition. For example, the curing may be carried out at a temperature of 50° C. to 100° C. for 15 minutes to 45 minutes.

Figure 7:
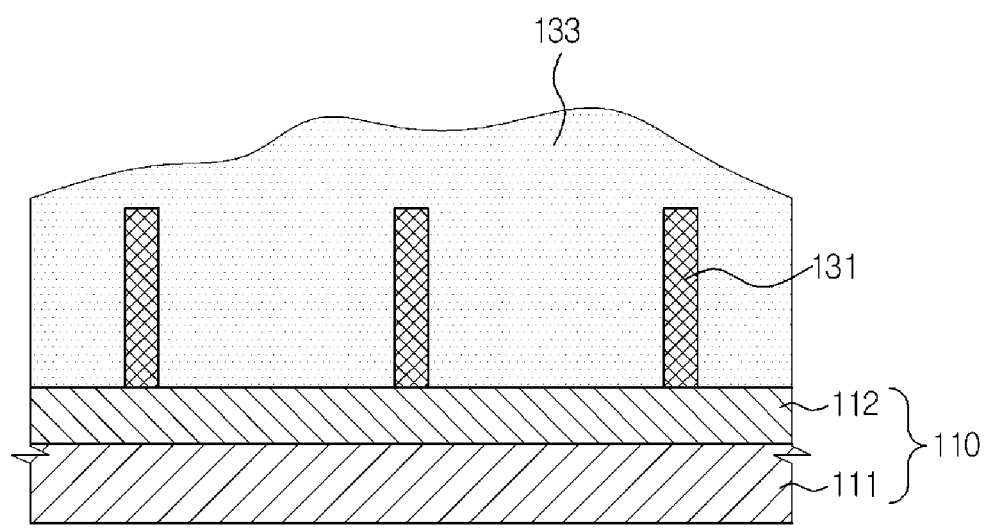
FIG. 7 is a schematic view illustrating a process of filling the cavity with the electric field-dependent material.
Figure 8:
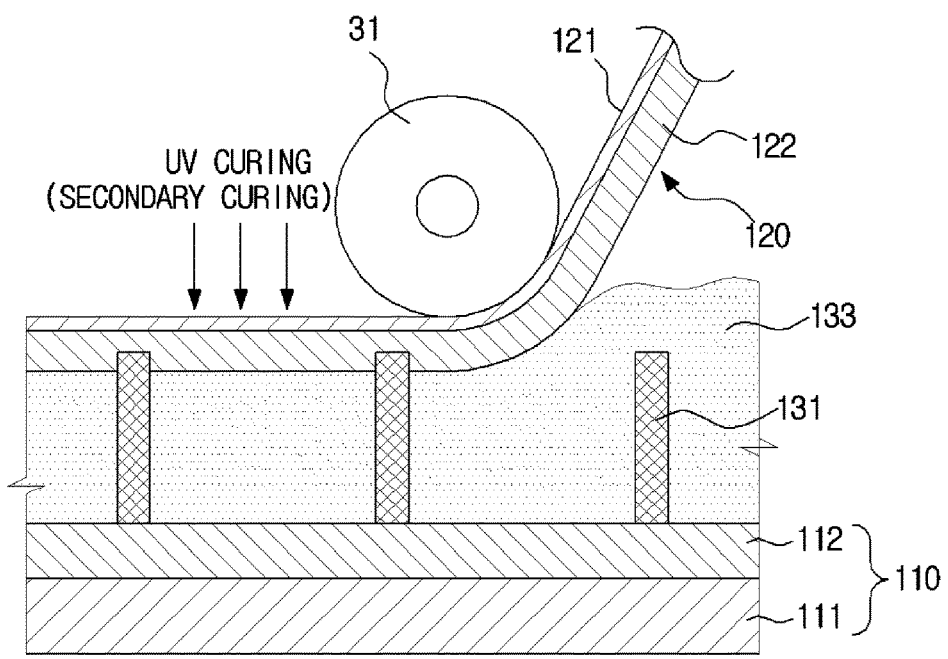
FIG. 8 is a schematic view illustrating a process of gradually stacking a second substrate on a first electrode module.
Figure 9:
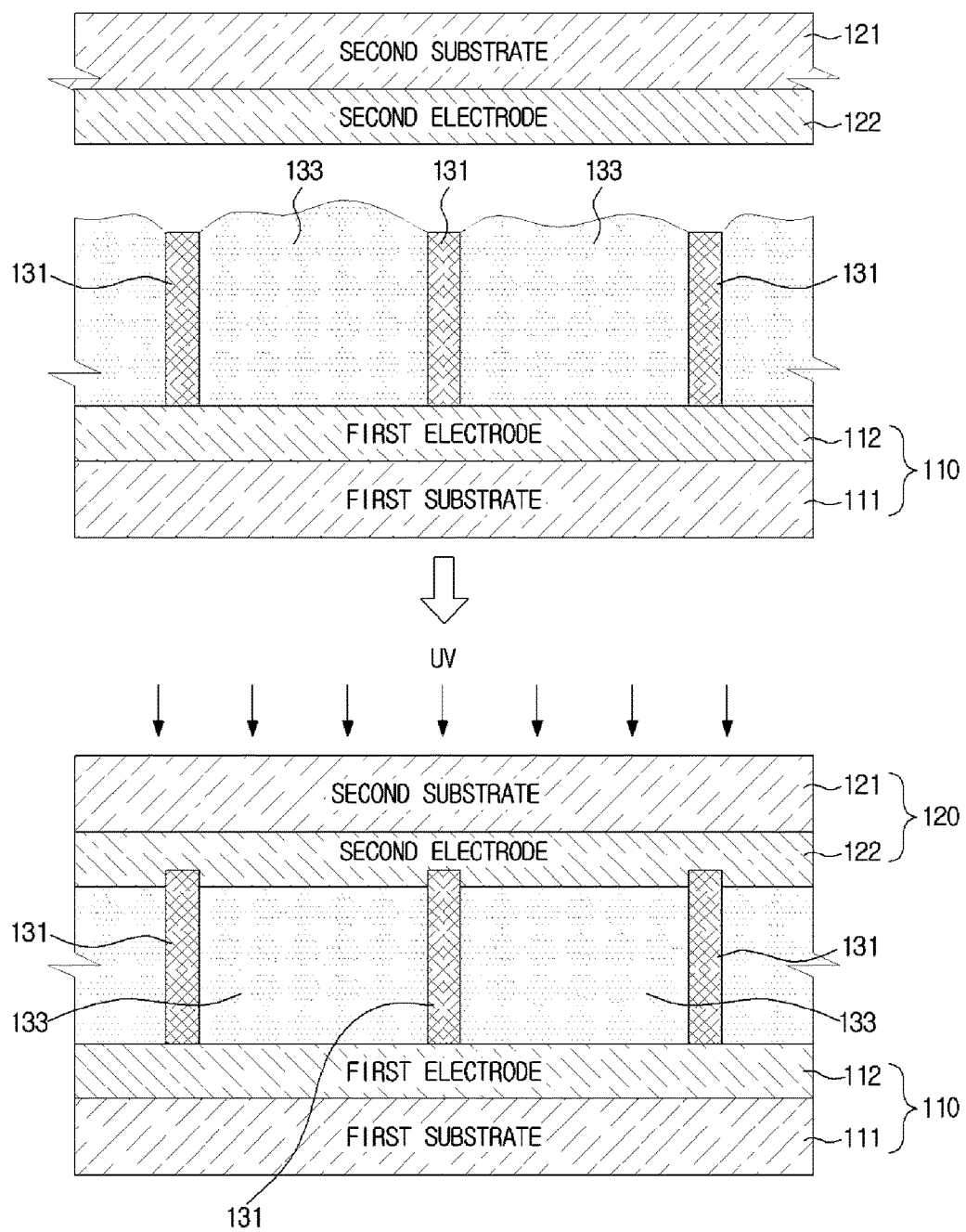
FIG. 9 is a schematic view illustrating a process of stacking the second substrate on the first electrode module at one time.

FIG. 7 is a schematic view illustrating a process of filling the cavity with the electric field-dependent material, FIG. 8 is a schematic view illustrating a process of gradually stacking a second substrate on a first electrode module and FIG. 9 is a schematic view illustrating a process of stacking the second substrate on the first electrode module at one time.

Referring to FIG. 7, the cavity 132 formed on the barrier 131 may be filled with an electric field-dependent material 133. When the cavity 132 is filled with the electric field-dependent material 133 and is scaled by the second electrode module 120, the electric field-dependent layer is formed in the cavity 132. The electric field-dependent material 133 and the electric field-dependent layer 133 are referred to by like reference numerals.

The electric field-dependent material 133 is a material, properties of which are changed by an electric field formed between the first electrode 112 and the second electrode 122 and may include at least one selected from the group consisting of fluorescent, photonic crystal, electrophoretic, electrowetting, liquid crystal and photoelectrochromic materials.

The electrophoretic material means a material inducing electrophoresis, the electrowetting material means a material inducing electrowetting and the photoelectrochromic material means a material inducing photoelectrochromism. These materials may be used in combination of two or more types thereof. Detailed description of the electric field-dependent material 133 will be given later.

After the cavity 132 is filled, the cavity 132 is sealed by stacking the second electrode composition-applied second substrate 121 on the first electrode module 110. As described above, the second electrode 122 is primarily cured and is present in a gel state before sealing of the cavity 132.

For example, as shown in FIG. 8, the second electrode module 120 may be stacked stepwise by roll pressing. In another example, the second electrode module 120 may be staked on the barrier 131 at one time, as shown in FIG. 9. Regarding the method of controlling the display device according to the embodiment, there is no limitation as to stack method of the second electrode module 120.

The stack method using roll pressing will be described in detail with reference to FIG. 8. When the roll pressing is used, the second electrode module 120 may be stacked on the barrier 131 while the second electrode module 120 is pressed with a roller 31 from one end to the other end.

The end of the barrier 131 may be inserted into the second electrode 122 by stacking the second electrode module 120 while pressing the same, because the second electrode 122 is present in a gel state.

Pressing is partially carried out when roll pressing is used. For this reason, secondary curing may be carried out during or immediately after pressing of the second electrode module 120. For example, the secondary curing may be UV curing. For this purpose, the second electrode composition contains a UV curing agent. A UV energy suitable for conditions such as composition or application thickness of the second electrode composition is pre-determined and UV light is then emitted to a region pressed by the roller 31. The region where UV light is emitted is cured and shrinks, thus further improving sealing.

When pressing to the other end of the second electrode module 120 is complete, a residue of the electric field-dependent material filling the cavity 132 flows from the cavity 132 and is removed, thus completing sealing.

The method of stacking the second electrode module 120 at one time will be described in brief with reference to FIG. 9. Mutual position between the first electrode module 110 and the second electrode module 120 is aligned and the second electrode module 120 is pressed while stacking the same on the barrier 131. In this case, too, secondary curing may be carried out during or immediately after pressing. The secondary curing may be partially performed according to the region where UV light is emitted at one time.

After the staking of the second electrode module 120 and the secondary curing, a display device 100 wherein the cavity 132 is sealed by inserting the end of the barrier 131 into the second electrode 122 is produced.

Adhesion testing is performed by drawing the second electrode 122 into which the end of the barrier 131 is inserted with a predetermined force. The second electrode composition including PEDOT is used and a test of drawing the second electrode 122 at a rate of 12.5 mm/min is repeated several times. As a result, adhesion force between the second electrode 122 and the barrier 131 is high, about 12 gf in average which is comparable to an adhesive tape.

Figure 10:
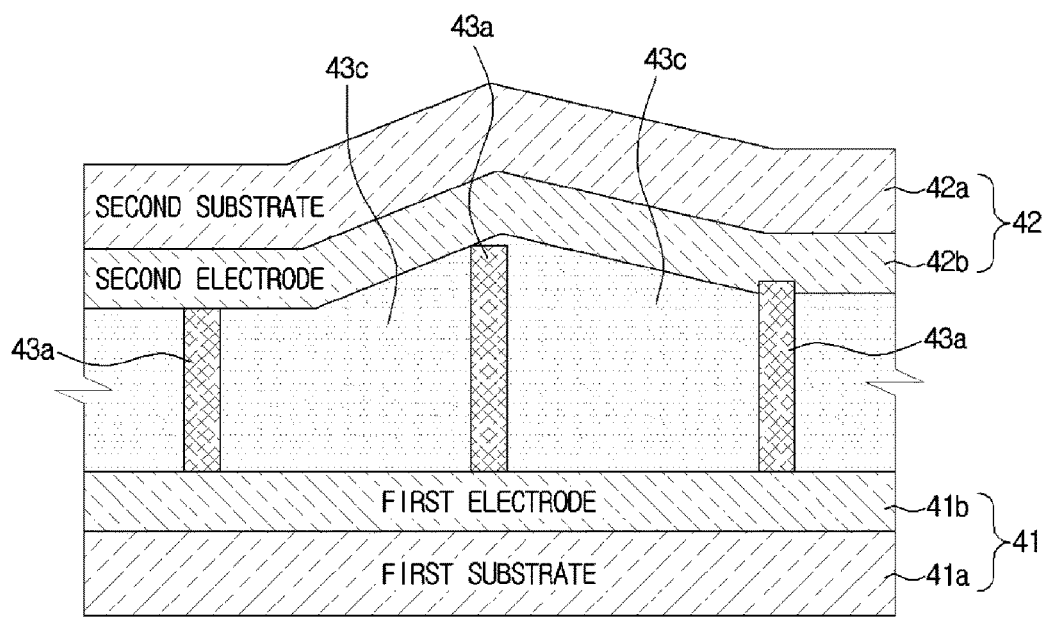
FIG. 10 shows a phenomenon resulting from stacking of a second electrode module using a conventional method.
Figure 11:
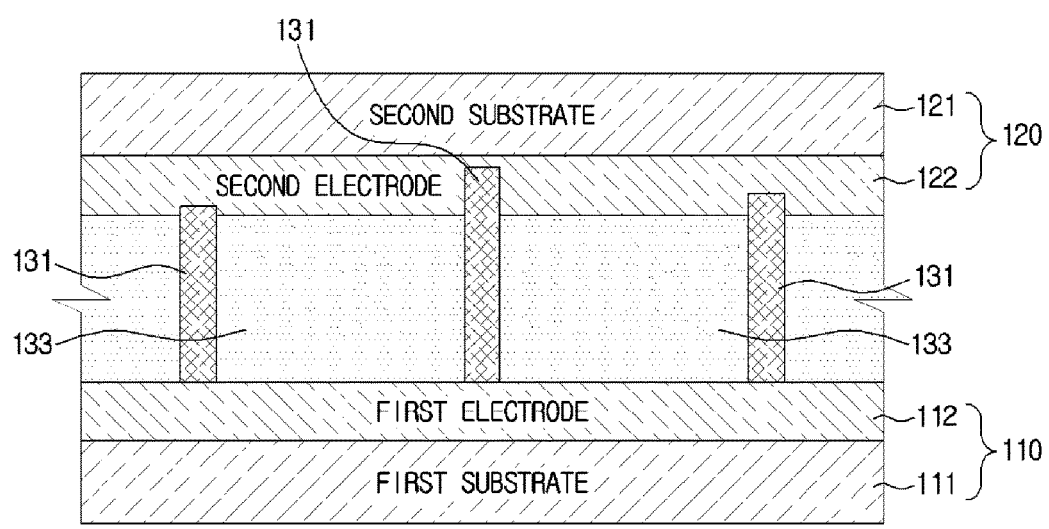
FIG. 11 shows a phenomenon resulting from stacking of the second electrode module according to the production method of the display device of the embodiment.

FIG. 10 shows a phenomenon resulting from stacking of a second electrode module using a conventional method and FIG. 11 shows a phenomenon resulting from stacking of the second electrode module according to the production method of the display device according to the embodiment.

There may be a difference in height between a plurality of barriers according to production method of the barrier. When a second electrode 42b of a second electrode module 42 is cured hard and the second electrode module 42 is stacked on a barrier 43a formed on a first electrode module 41, a second substrate 42a is not flat, as shown in FIG. 10. The first electrode module 41 includes a first substrate 41a and a first electrode 41b.

When the second substrate 42a is not flat, mura of light is generated on the surface of the second substrate 42a and contrast ratio is lowered.

However, when the second electrode module 120 is stacked on the barrier 131 under the condition that the second electrode 122 is present in a gel state according to the production method of the display device according to the embodiment, as shown in FIG. 1, a higher barrier 131 is inserted to a greater thickness into the second electrode 122 and a lower barrier 131 is inserted to a smaller thickness into the second electrode 122. The surface of the second substrate 121 is flattened although there is a difference in height between the barriers 131. Accordingly, light mura is inhibited and contrast ratio is improved.

Meanwhile, only some of the barriers 131 according to the structure of barrier 131 formed on the first electrode module 110 may be inserted into the second electrode 122. In this case, when the first electrode module 110 provided with the barrier 131 is seen from above, only some barriers 131 disposed in the middle may be inserted into the second electrode 122 and only barriers 131 disposed in the outermost region may be inserted into the second electrode 122.

Hereinafter, specific examples of the display device 100 produced by the production method of the display device according to the embodiment will be described in detail.

The display device 100 may be implemented with a reflective display device. The reflective display device is a display device which displays information using exterior light without a separate light source provided therein and displays information such as text, images or color when exterior light is reflected from the surface of the display device 100.

Properties of the electric field-dependent layer 133 are changed by a voltage applied to the first electrode 112 and the second electrode 122. Accordingly, wavelength of light reflected from the electric field-dependent layer 133 may be changed according to the voltage applied to the first electrode 112 and the second electrode 122. Accordingly, the color displayed by the display device 100 is changed by controlling applied voltage, the display device 100 is converted to be transparent so that an object present on the rear surface of the display device 100 is seen, and the display device 100 is converted to reflect all types of light so that the display device 100 looks like a mirror.

Figure 12A:
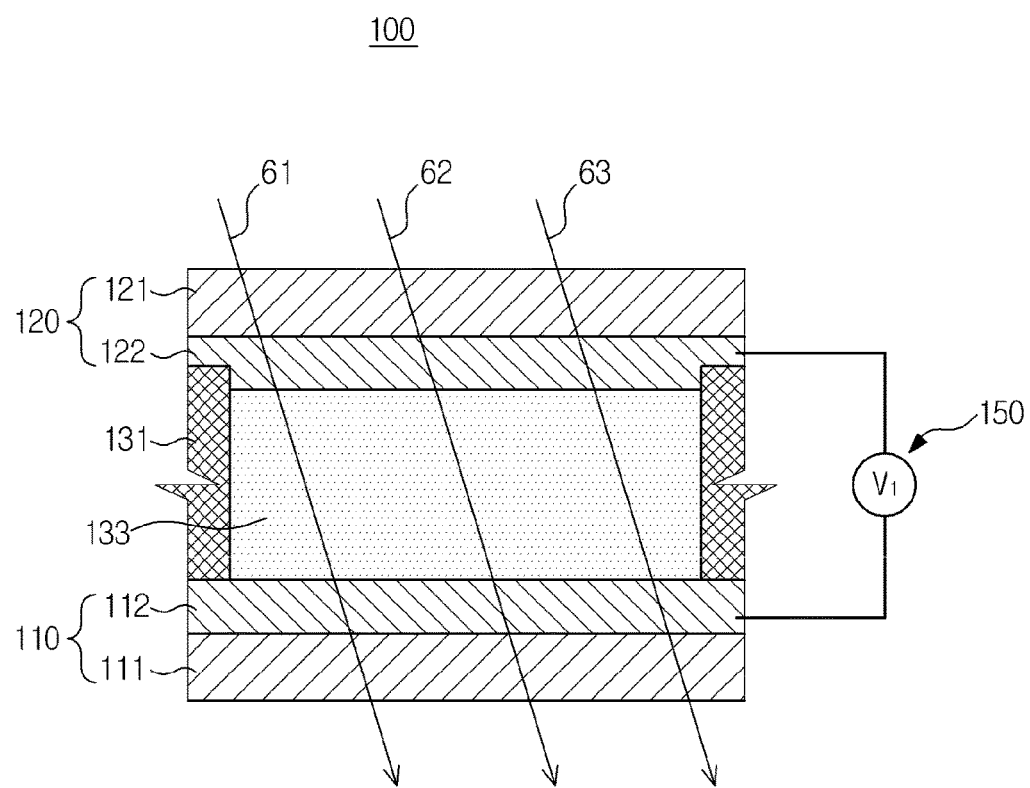
FIGS. 12A to 12C show a principle in which color displayed on the display device is changed according to the voltage applied to the first electrode and the second electrode.
Figure 12B:
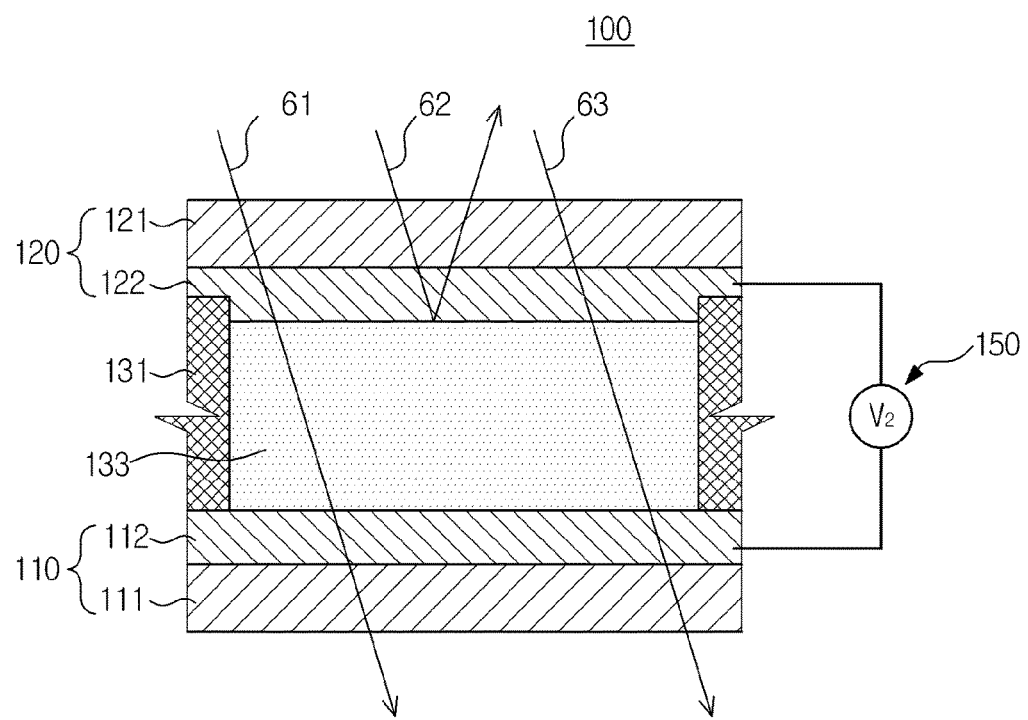
Figure 12C:
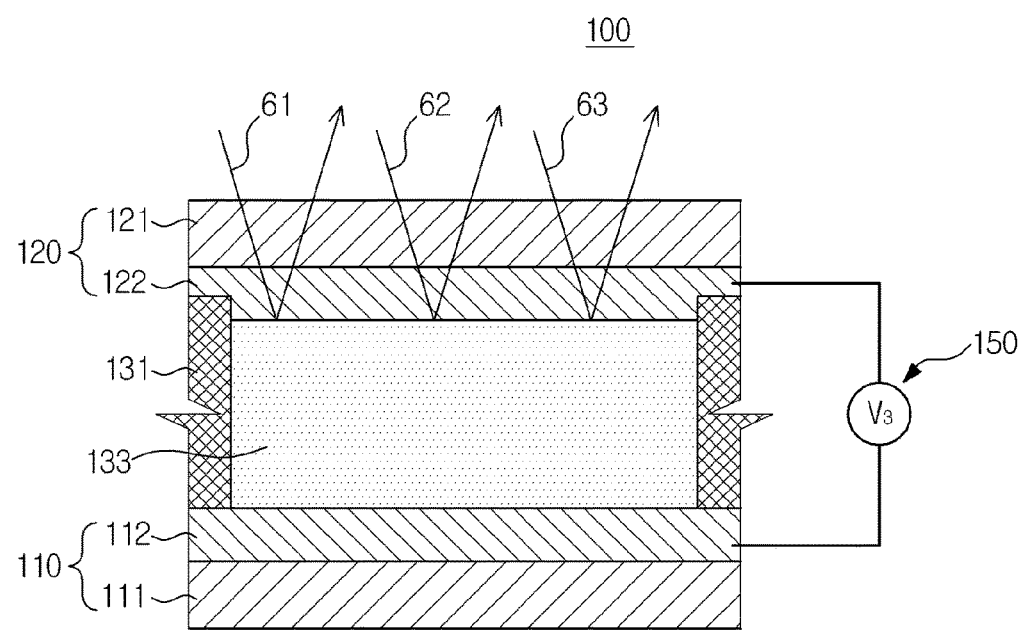

FIGS. 12A to 12C show a principle in which color displayed on the display device is changed according to voltage applied to the first electrode and the second electrode.

In general, light emitted from an exterior light source includes all wavelengths of light corresponding to a visible light range, but, in the present example, light emitted from the exterior light source includes three different wavelengths of light 61, 62 and 63 for convenience of description.

Referring to FIG. 12A, all of the three different wavelengths of light 61, 62 and 63 are not reflected and transmit the second electrode module 120 when a predetermined voltage V1 is applied to the first electrode 112 and the second electrode 122. When the first electrode 112 and the first substrate 111 are transparent, a viewer seeing the second substrate 121 sees an object present on the rear surface of the first substrate 111.

Referring to FIG. 12B, among the three different wavelengths of light 61, 62 and 63, one light 62 is reflected and the remaining light 61 and 63 are not reflected and transmit the second electrode module 120 when a predetermined voltage V2 is applied to the first electrode 112 and the second electrode 122. In this case, color having a wavelength of the reflected light 62 is displayed through the second substrate 121.

Referring to FIG. 12C, all of the three different wavelengths of light 61, 62 and 63 are reflected when a predetermined voltage V3 is applied to the first electrode 112 and the second electrode 122, and the second substrate 121 is flat so that the second substrate looks like a mirror to the viewer.

In the example shown in FIGS. 12A to 12C, only the first electrode module 110 and the second electrode module 120 corresponding to one cavity 132 are described, but a plurality of cavities 132 independently display colors when the first electrode 112 or the second electrode 122 corresponding to the cavities 132 is independently addressed.

The first electrode module 110 and the second electrode module 120 may be driven in an active or passive matrix manner. When the first electrode module 110 and the second electrode module 120 are driven in the active matrix manner, a transistor may be used as a switch to control a voltage applied to the cavity 132.

A display method of the display device 100 is changed according to the electric field-dependent material 133 filling the cavity 132. Hereinafter, the type of the electric field-dependent material 133 will be described in detail.

Figure 13:
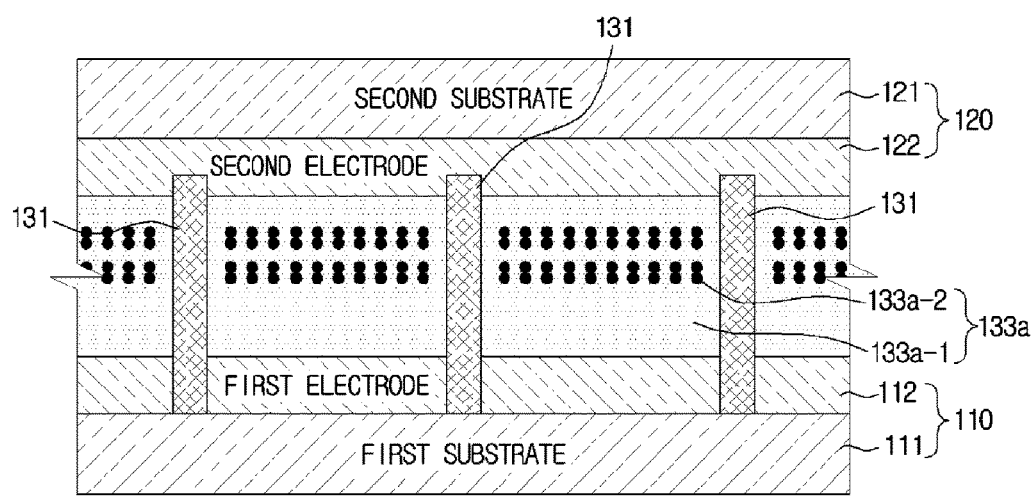
FIG. 13 is a sectional view illustrating a display device having cavities filled with a photonic crystal material.

FIG. 13 is a sectional view illustrating a display device having the cavity filled with a photonic crystal material.

A photonic crystal has a structure in which only a certain wavelength of incident exterior light is reflected due to photonic band gap formed by regular arrangements of spatially repeated fine structures and a color displayed by the photonic crystal is referred to as a structure color.

The formation of the photonic band gap is determined according to size, gap, refractive index difference or the like of particles constituting the photonic crystal. Accordingly, when properties of the photonic crystal are changed by controlling intensity or direction of the electric field, displayed color is controlled.

The photonic crystal is implemented by stacking materials having different refractive indexes or regularly arranging the materials on the same surface or space. In the present embodiment, one structure having the photonic crystal is referred to as a photonic crystal layer.

For example, as shown in FIG. 13, a photonic crystal layer 133a may be formed by dispersing particles 133a-2 in a colloid solvent 133a-1. The colloid solvent 133a-1 and particles 133a-2 dispersed in the colloid solvent 133a-1 are photonic crystal materials described in the embodiment of the production method of the display device.

The particles 133a-2 may be negatively or positively charged and the particles 133a-2 may be spaced from one another by a predetermined distance due to repulsive force therebetween when they are charged with the same type. The particles 133a-2 may have several nanometers (nm) to several hundred micrometers (μm), but the embodiments of the display device 100 and the production method of the display device 100 are not limited thereto.

The particles 133a-2 may include at least one selected from the group consisting of elements such as silicon (Si), titanium (Ti), barium (Ba), strontium (Sr), iron (Fe), nickel (Ni), cobalt (Co), lead (Pb), aluminum (Al), copper (Cu), silver (Ag), gold (Au), tungsten (W), and molybdenum (Mo) and oxides thereof.

The particles 133a-2 may include at least one selected from polymer materials including polystyrene, polyethylene, polypropylene (PP), polyvinyl chloride, and polyethylene terephthalate.

Alternatively, the particles 133a-2 may be non-charged particles or clusters coated with a charged material.

The intensity or direction of electric field formed in the cavity 132 is changed according to voltage applied to the first electrode 112 and the second electrode 122. The distance between the particles 133a-2 is controlled by the intensity or direction of electric field formed in the cavity 132 and a photonic band gap is formed and wavelength of reflected light is changed according to the distance between the particles 133a-2.

Alternatively, the particles 133a-2 may be not charged and a dielectric liquid crystal, refractive index of which is changed according to intensity of electric field may be used as the colloid solvent 133a-1. In this case, a photonic band gap is not formed when a difference in refractive index between the dielectric liquid crystal and the particles 133a-2 is controlled to a level lower than a predetermined value by creating an electric field in the cavity 132 and the photonic band gap is formed and a predetermined wavelength of light is reflected when the difference is controlled to a level not lower than the predetermined value. As difference in refractive index increases, the photonic band gap also increases.

In a specific example, polystyrene panicles 133a-2 having a diameter of about 100 nm to about 500 nm are dispersed in a ferroelectric liquid crystal that may have a dielectric constant of about 2 to about 10 according to intensity of the electric field to form a photonic crystal layer 133a and a level of voltage applied to the first electrode 112 and the second electrode 122 is controlled to regulate the wavelength of light reflected from the photonic crystal layer 133a.

Meanwhile, as illustrated in FIG. 13, the photonic crystal layers 133a formed in the respective cavities 132 are independently controlled and the cavities 132 exhibit different colors.

Full color is implemented without using color filters and an ultra low power display device having superior exterior visibility is implemented by a simple manufacturing process by applying a reflective display method using a photonic crystal structure to the display device 100, as described above.

Figure 14:
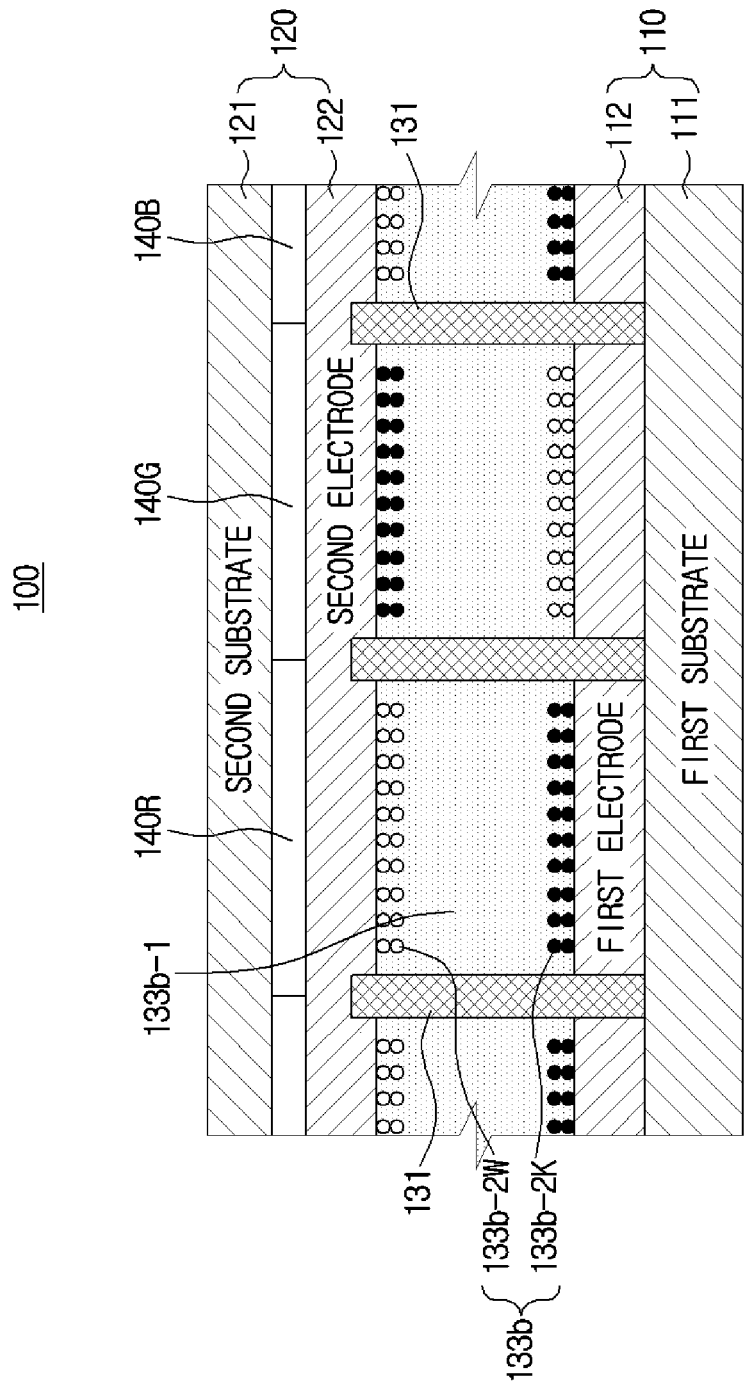
FIG. 14 is a sectional view illustrating a display device having cavities filled with an electrophoretic material.

FIG. 14 is a sectional view illustrating a display device in which cavities are filled with an electrophoretic material.

In another example, electrophoresis may be used to implement a reflective display device. The electrophoresis is a phenomenon in which charged particles are moved by an electric field formed between two electrodes.

Referring to FIG. 14, the cavity 132 may be filled with a fluid 133b-1 having a high resistance and a low viscosity and one or more types of charged particles 133b-2 dispersed in the fluid 133b-1. The fluid 133b-1 and the charged particles 133b-2 correspond to the electrophoretic material described in the embodiment of the production method of the display device and constitute the electrophoretic layer 133b.

The fluid 133b-1 may be a solution including one or more dielectric liquids or a gas. The charged particles 133b-2 may be positively or negatively charged and may be pigment, dye, metal, metal oxide or resin particles or a combination thereof. For example, the charged particles 133b-2 may be a mixture of pigment and polymer particles and the mixture may be polymer particles surface-coated with a pigment, or a composition in which the pigment is dispersed in the polymer.

The charged particles 133b-2 may have a diameter of submicrometers to several tens of micrometers, for example, about 0.02 μm to about 50 μm. However, the embodiments of the display device 100 and the method of producing the display device are not limited to the diameter of the charged particles 133b-2.

Charged particles 133b-2 having different colors may be dispersed in one cavity 132. As described in the example of FIG. 15, one cavity 132 may include white charged particles 133b-2W and black charged particles 133b-K and these charged particles may be charged with opposite charges.

As an electric field is formed upon application of voltage to the first electrode 112 and the second electrode 122, the white charged particles 133b-2W and the black charged particles 133b-2K move to the first electrode 112 or the second electrode 122 and the wavelength of light reflected from the electrophoretic layer 133b is changed according to the position of the white charged particles 133b-2W and the black charged particles 133b-2K.

The second electrode module 120 may include color filters 140R, 140G and 140B and light reflected from the electrophoretic layer 133b may pass through the color filters 140R, 140G and 140B and render color. The color filters 140R, 140G and 140B may be provided in the first electrode module 110.

In addition, as shown in FIG. 14, the respective cavities 132 may exhibit different colors when electrophoretic layers 133b formed in the respective cavities 132 are independently controlled.

Figure 15:
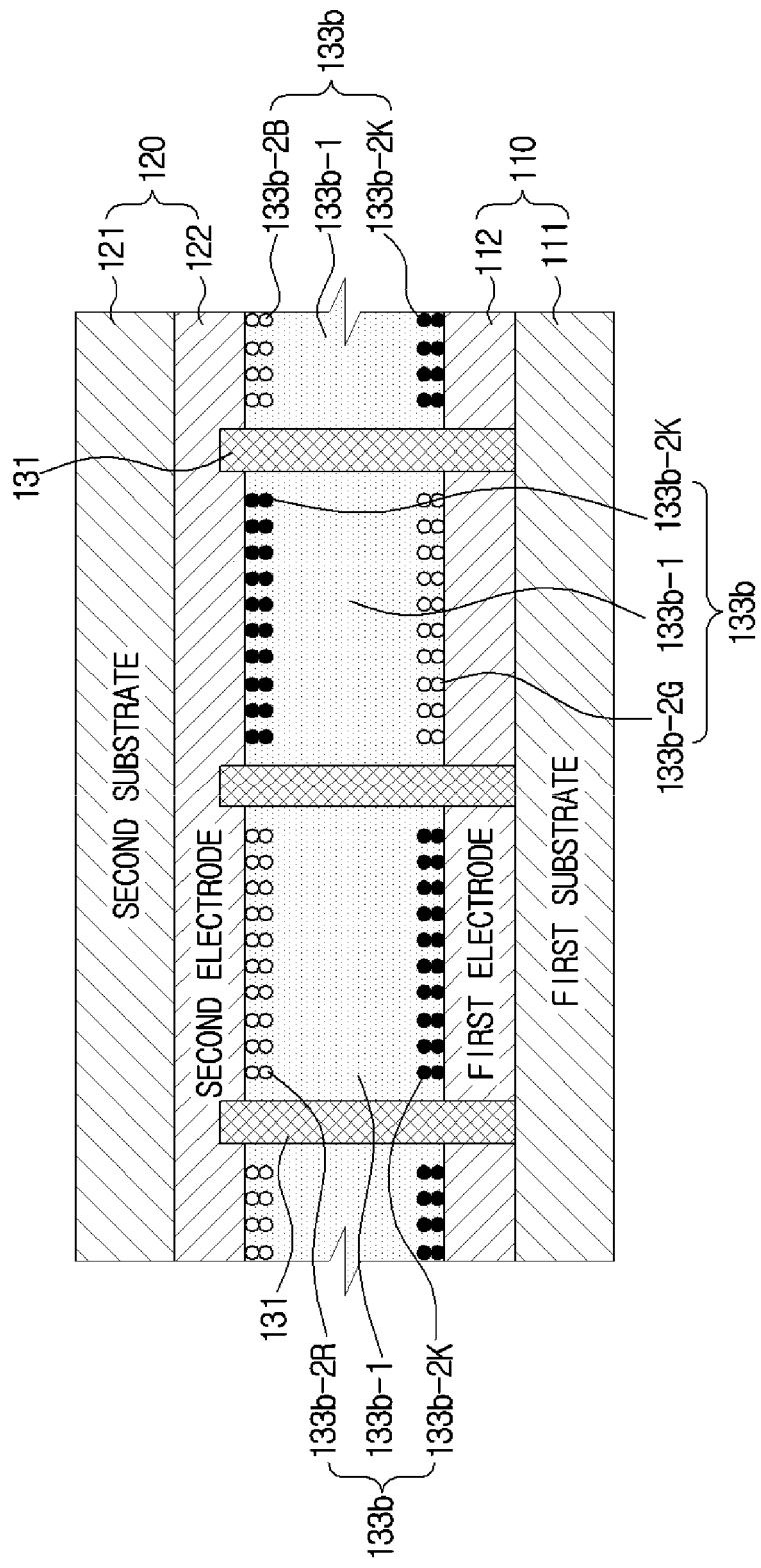
FIG. 15 is a sectional view illustrating the display device having cavities filled with an electrophoretic material wherein the display device has no color filters.

FIG. 15 is a sectional view illustrating the display device having no color filters, in which cavities are filled with an electrophoretic material.

As exemplified in FIG. 15, red, green or blue charged particles 133b-2 may be dispersed in the respective cavities 132 so as to implement multi-color without using color filters. As exemplified in FIG. 16, black charged particles 133b-2K and red charged particles 133b-2R may be dispersed in one cavity 132, black charged particles 133b-2K and green charged particles 133b-2G may be dispersed in another cavity 132 adjacent thereto, and black charged particles 133b-2K and blue charged particles 133b-2B may be dispersed in another cavity 132B adjacent thereto.

These three cavities constitute one unit pixel and produce a color by additive color mixture without using color filters.

In a specific example, it is assumed that red charged particles 133b-2R, green charged particles 133b-2G and blue charged particles 133b-2B are positively charged and black charged particles 133b-2K are negatively charged.

In accordance with the example shown in FIG. 15, the first electrode 112 is implemented with individual electrodes so that electrophoretic layers 133b formed in the respective cavities 132 are independently controlled. A red wavelength of light is reflected from the cavity in which red charged particles 133b-2R move to the second electrode 122 and a blue wavelength of light is reflected from the cavity in which blue charged particles 133b-2B move to the second electrode 122. In addition, all incident light is absorbed in the cavity 132 in which black charged particles 133b-2K move to the second electrode 122. Accordingly, a mixed color of red and blue is seen by the viewer.

As described above, a wide viewing angle close to a printing medium may be obtained when the display device 100 uses electrophoresis.

Figure 16:
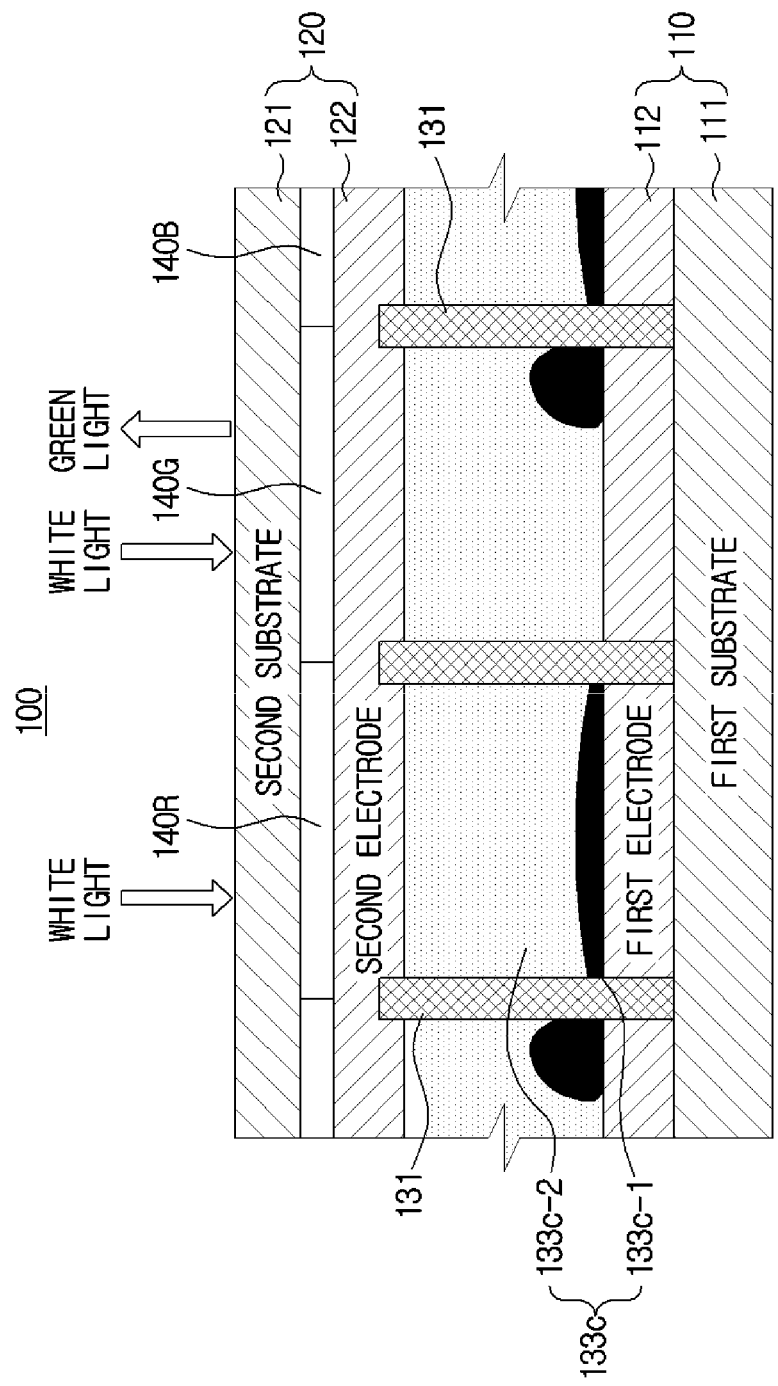
FIG. 16 is a lateral sectional view illustrating a display device having cavities filled with an electrowetting material.

FIG. 16 is a lateral sectional view illustrating a display device in which cavities are filled with an electrowetting material.

An electrowetting type display device employs a principle in which conductive fluid (water) is immiscible with a non-conductive fluid (oil). When surface tension of the conductive fluid is controlled by application of an exterior voltage, contact angle of the conductive fluid and shape of the interface between two fluids are changed and wavelength of reflected light is thus changed.

Referring to FIG. 16, an electrowetting layer 133c is formed in the cavity 132 and includes a first fluid 133c-1 and a second fluid 133c-2 that are immiscible with each other. The first fluid 133c-1 is electrically non-conductive or non-polar and the second fluid 133c-2 is electrically conductive or polar. For example, the first fluid 133c-1 is an organic solvent such as silicone oil, mineral oil or carbon tetrachloride and the second fluid 133c-2 is an aqueous solution or an electrolytic material such as sodium chloride.

The first fluid 133c-1 includes a black pigment or a light-absorbing material and thus absorbs incident light, and the first fluid 133c-1 may spread throughout the cavity 132 or move to the barrier 131 and thus function as a light shutter. On the other hand, the second fluid 133c-2 is made of a transparent material and thus transmits incident light.

Although not shown, the first electrode 112 may be coated with a hydrophobic insulator.

A red color filter 140R, a green color filter 140O and a blue color filter 140B are disposed in the second electrode module 120 such that the red, green and blue color filters 140R, 140G and 140B one-to-one correspond to the cavities 132. The disposition of the color filters 140R, 140G and 140B shown in FIG. 16 is provided as only an example and the color filters 140R, 140G and 140B may be disposed in the first electrode module 110.

In addition, the display device 100 may not include the color filters 140R, 140G and 140B when the first fluid 133c-1 includes a dye such as red, green or blue or a material having color such as red, green or blue.

The first fluid 133c-1 and the second fluid 133c-2 are not mixed with each other and form a boundary when they contact each other because they have different polarities. Upon application of voltage to the first electrode 112 and the second electrode 122, the first fluid 133c-1 is pushed toward the barrier 131 due to movement of the second fluid 133c-2 and light incident upon the corresponding cavity 132 is reflected and passes through the color filter 140G. As a result, the color of the corresponding color filter 140G is seen to the viewer. Green is seen to the viewer in the example shown in FIG. 16.

Because the entire surface of the bottom of the cavity 132 is covered with an oil when a voltage is not applied, all incident light is absorbed and it is thus dark.

Accordingly, as shown in FIG. 16, desired color is obtained by independently controlling the electrowetting layers 133c respectively formed in the cavities 132 using the first electrodes 112 that may be independently addressed. As described above, rapid response and high reflectivity are obtained when the display device 100 employs an electrowetting method, as described above.

Figure 17A:
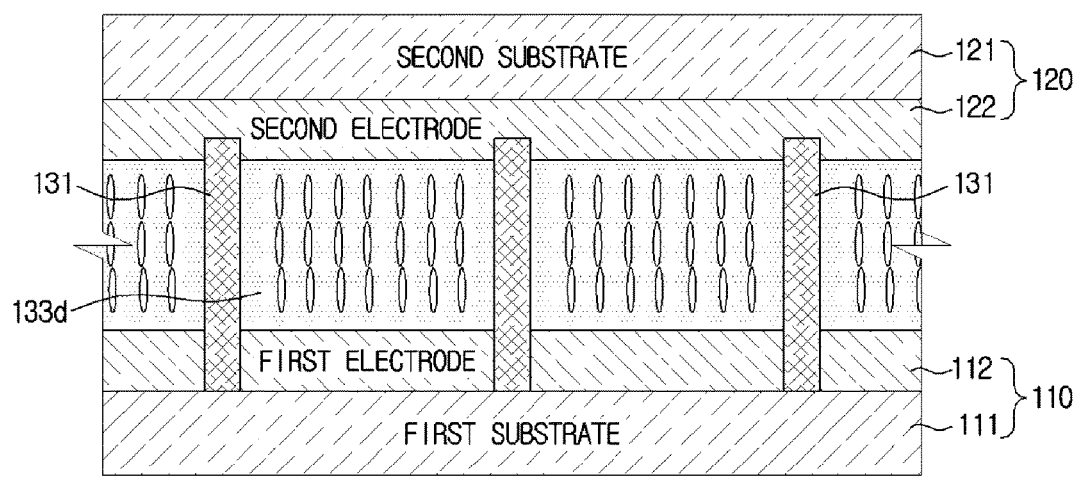
FIGS. 17A to 17C are sectional views illustrating the display device having cavities filled with a cholesteric liquid crystal, wherein the cholesteric liquid crystal is present in different states.
Figure 17B:
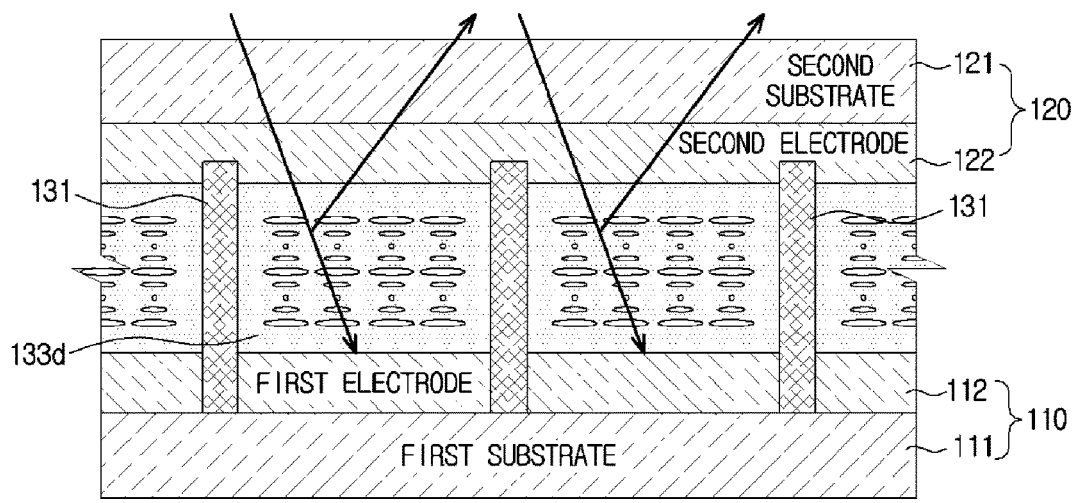
Figure 17C:
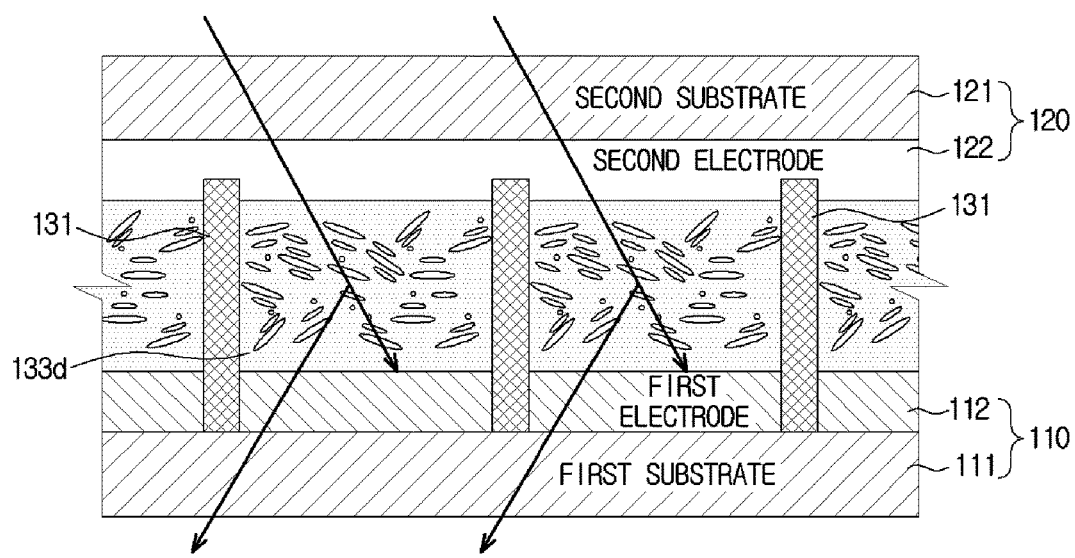

FIGS. 17A to 17C are sectional views illustrating a display device including a cavity filled with a cholesteric liquid crystal, wherein the cholesteric liquid crystal is present in different states.

The cholesteric liquid crystal reflects or transmits incident light as a helical liquid crystal is changed in an axial direction by an applied electric field.

As shown in FIGS. 17A to 17C, when a liquid crystal layer 133d is formed by filling the cavity 132 with a cholesteric liquid crystal, the structure of the liquid crystal layer 133d is changed according to voltage applied to the first electrode 112 and the second electrode 122.

The liquid crystal layer 133d may include a nematic liquid crystal, a chiral dopant and a photopolymerizable polymer and the photopolymerizable polymer fixes a cholesteric helical pitch when the chiral dopant induces a regular helical structure to the nematic liquid crystal.

In addition, although not shown in the drawing, an alignment film for alignment of liquid crystals may be respectively provided in an upper part of the first electrode 112 and a lower part of the second electrode 122.

The liquid crystal layer 133d reflects exterior light based on the Bragg's Law. In this case, color is obtained by reflecting a certain wavelength of light in a visible light region through artificial control of chiral properties.

The cholesteric liquid crystal may be divided into three types of planar, focal conic and homeotropic liquid crystals.

FIG. 17A illustrates a homeotropic liquid crystal alignment. The homeotropic liquid crystal is created when a strong electric field is formed between the first electrode 112 and the second electrode 122 and has the property of transmitting light.

FIG. 17B illustrates a planar liquid crystal alignment. The planar liquid crystal alignment means a state in which a helical axis of planar liquid crystal is aligned substantially vertical to a substrate, for example, a first substrate 111. The planar liquid crystal layer 133d has an alignment created when a strong electric field applied to the homeotropic liquid crystal is rapidly reduced and in the planar state, axes having a helical structure form a right angle with the surface of the first substrate 111.

Cholesteric liquid crystal reflects different colors such as RGB to render colors by controlling twist level of the helical structure.

The cholesteric liquid crystal reflects a certain wavelength of light among light incident from the planar phase. The certain wavelength is determined according to helical pitch in the helical structure of the cholesteric liquid crystal. That is, reflected color is controlled by controlling helical pitch of the cholesteric liquid crystal because wavelength of reflected light is determined by controlling the helical pitch.

FIG. 17C illustrates a focal conic liquid crystal alignment. The focal-conic state means that a helical axis of cholesteric liquid crystal is aligned in substantially parallel with the first substrate 111. The focal conic liquid crystal alignment is created when a strong electric field applied to the homeotropic liquid crystal is slowly reduced and has the property of scattering light.

That is, the liquid crystal layer 133d has bistability that it is present in a planar state and in a focal-conic state enabling reflection or scattering of light although an electric field is not applied and is converted into a homeotropic state in which light is transmitted when a sufficient electric field is applied. The cholesteric liquid crystal of the liquid crystal layer 133d may be switched between two stable states, i.e., focal conic and planar states.

For example, the helical axis that is vertical to the first substrate 111 is changed to be parallel with the first substrate 111 when an electric field is applied to planar cholesteric liquid crystals. As a result, the liquid crystal becomes a focal-conic state.

When a stronger electric field is applied to a focal-conic cholesteric liquid crystal, the helical structure is untwisted and the liquid crystal becomes a homeotropic state in which liquid crystal molecules are aligned in an electric field direction. In this case, the liquid crystal may return to the focal-conic state when the electric field is slowly removed, and the liquid crystal may become a planar state when the electric field is rapidly removed.

For convenience of description, the examples of FIGS. 17A to 17C are shown based on the ground that liquid crystal layers 133d formed in different cavities 132 have the same alignment, but liquid crystal layers 133d formed in the respective cavities 132 may be independently controlled when the first electrode 112 is implemented with individual electrodes that may be independently addressed.

For example, the liquid crystal layer 133d formed in one cavity 132 is controlled to implement red, the liquid crystal layer 133d formed in another cavity 132 adjacent thereto is controlled to implement green and the liquid crystal layer 133d formed in another cavity 132 adjacent thereto is controlled to implement blue, and the three liquid crystal layers 133d are defined as one unit pixel, to implement a desired color.

As is apparent from the above description, a display device and a method of producing the same according to the embodiments of the present invention provide superior surface flatness of an upper electrode substrate and excellent sealing effects by performing sealing such that an end of a barrier formed in a front electrode is inserted into the upper electrode having a gel-state.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A display device comprising:
a first electrode module comprising a first electrode;
a second electrode module comprising a second electrode, the second electrode module facing the first electrode module;
a plurality of barriers formed on the first electrode module, each barrier having an end inserted into the second electrode;
a plurality of cavities formed by the first electrode module and the barriers; and
an electric field-dependent layer formed in each of the cavities, the electric field-dependent layer having properties changed by an electric field applied between the first electrode module and the second electrode module, and
wherein a thickness of the second electrode is greater than a depth of the end inserted into the second electrode, so that the end inserted into the second electrode is completely surrounded by the second electrode.

2. The display device according to claim 1, wherein the second electrode composition comprises at least one selected from the group consisting of a conductive polymer, carbon nanotubes (CNT), a metal nano-powder and graphene.

3. The display device according to claim 2, wherein the conductive polymer comprises at least one selected from the group consisting of polythiophene (PT), polyacetylene (PA), polyaniline (PA), polypyrrole (PPy) and polyphenylene (PP).

4. The display device according to claim 2, wherein the conductive polymer comprises poly(3,4-ethylenedioxythiophene) (PEDOT).

5. The display device according to claim 2, wherein the second electrode composition further comprises a UV curing agent or a heat curing agent.

6. The display device according to claim 1, wherein the electric field-dependent layer comprises at least one selected from the group consisting of a photonic crystal layer, an electrophoretic layer, an electrowetting layer, a cholesteric liquid crystal layer and a photoelectrochromic layer.

7. The display device according to claim 1, wherein the first electrode module further comprises a first substrate on which the first electrode is formed.

8. The display device according to claim 1, wherein the second electrode module further comprises a transparent second substrate on which the second electrode is formed, and
the second electrode is transparent.

9. The display device according to claim 7, wherein the first electrode and the first substrate are transparent.

10. A method of producing a display device comprising:
forming a plurality of barriers on a first electrode module comprising a first substrate and a first electrode;
applying a second electrode composition to a lower surface of a second substrate;
primarily curing the applied second electrode composition to a gel state;
stacking the second substrate on the barriers formed on the first electrode module, wherein the stacking includes inserting an end of each of the plurality of barriers into the gel-state second electrode composition; and
secondarily curing the second electrode composition,
wherein a thickness of the second electrode composition is greater than a depth of the end inserted into the second electrode composition, so that the end inserted into the second electrode composition is completely surrounded by the second electrode composition.

11. The method according to claim 10, wherein the secondary curing comprises emitting UV light or heat to the second electrode composition-applied second substrate.

12. The method according to claim 10, wherein the second electrode composition comprises a conductive material present in a gel state and a UV curing agent or a heat curing agent.

13. The method according to claim 12, wherein the conductive material comprises at least one selected from the group consisting of a conductive polymer, carbon nanotutes (CNT), a metal nano-powder and graphene.

14. The method according to claim 10, wherein the stacking comprises using a roll pressing process.

15. The method according to claim 10, wherein the stacking is performed simultaneously with the secondary curing.

16. The method according to claim 10, further comprising forming an electric field-dependent layer having properties changed by an electric field, in the cavities formed by the barriers.

17. The method according to claim 16, wherein the forming the electric field-dependent layer is performed before the stacking the second substrate.

18. The method according to claim 16, wherein the forming the electric field-dependent layer comprises filling the cavities with at least one of a photonic crystal material, an electrophoretic fluid comprising charged particles, a plurality of fluids immiscible with each other and a cholesteric liquid crystal.

* * * * *